United States Patent
Tange et al.

(10) Patent No.: US 8,000,874 B2
(45) Date of Patent: Aug. 16, 2011

(54) VEHICLE HEADWAY MAINTENANCE ASSIST SYSTEM AND METHOD

(75) Inventors: Satoshi Tange, Fujisawa (JP); Kenichi Egawa, Tama (JP); Yosuke Kobayashi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 1119 days.

(21) Appl. No.: 11/683,657

(22) Filed: Mar. 8, 2007

(65) Prior Publication Data

US 2007/0213915 A1 Sep. 13, 2007

(30) Foreign Application Priority Data

Mar. 10, 2006 (JP) ................. 2006-066366
Mar. 10, 2006 (JP) ................. 2006-066546

(51) Int. Cl.
*B60T 7/12* (2006.01)
(52) U.S. Cl. .......................... 701/96; 701/301
(58) Field of Classification Search .............. 701/96, 701/301; 180/170
See application file for complete search history.

(56) References Cited

U.S. PATENT DOCUMENTS

| | | | |
|---|---|---|---|
| 5,684,473 A | 11/1997 | Hibino et al. | |
| 5,808,561 A | 9/1998 | Kinoshita et al. | |
| 7,006,917 B2* | 2/2006 | Hijikata | 701/301 |
| 2005/0182549 A1* | 8/2005 | Seki | 701/70 |

FOREIGN PATENT DOCUMENTS

| | | |
|---|---|---|
| EP | 1 285 842 A2 | 2/2003 |
| EP | 1 327 552 A2 | 7/2003 |
| EP | 1 375 234 A2 | 1/2004 |
| JP | H10-166889 | 6/1998 |
| JP | H10-306872 A | 11/1998 |
| JP | H10-318009 | 12/1998 |
| JP | H11-105579 | 4/1999 |
| JP | 2003-025870 | 1/2003 |
| JP | 2003-246226 A | 9/2003 |
| JP | 2004-017847 A | 1/2004 |
| JP | 2004-161100 | 6/2004 |
| JP | 2004-161175 | 6/2004 |
| JP | 2004-306690 | 11/2004 |
| JP | 2005-329786 | 12/2005 |
| JP | 2006-001323 | 1/2006 |
| WO | WO-2005/084992 A1 | 9/2005 |

OTHER PUBLICATIONS

The Office Action of corresponding Japanese Application No. 2006-066366, dated Oct. 19, 2010 and mailed Oct. 26, 2010.
The Office Action of corresponding Japanese Application No. 2006-066546, dated Oct. 27, 2010 and mailed Nov. 9, 2010.

* cited by examiner

*Primary Examiner* — John Nguyen
*Assistant Examiner* — Brian J Broadhead
(74) *Attorney, Agent, or Firm* — Global IP Counselors, LLP

(57) ABSTRACT

A vehicle headway maintenance assist system is configured to perform a haptic notification control of an accelerator to prompt the driver to release the accelerator when the accelerator is being operated and to perform a deceleration control of the vehicle based on headway distance when the accelerator is being operated as long as the headway distance from a preceding vehicle is less than a prescribed headway distance threshold.

17 Claims, 13 Drawing Sheets

VEHICLE HEADWAY MAINTENANCE ASSIST SYSTEM AND METHOD

CROSS-REFERENCE TO RELATED APPLICATIONS

This application claims priority to Japanese Patent Application Nos. 2006-066546, filed on Mar. 10, 2006 and 2006-066366, filed on Mar. 10, 2006. The entire disclosures of Japanese Patent Application Nos. 2006-066546 and 2006-066366 are hereby incorporated herein by reference.

BACKGROUND OF THE INVENTION

1. Field of the Invention

The present invention generally relates to a vehicle headway maintenance assist system for controlling the headway distance from a preceding vehicle. More specifically, the present invention relates to a vehicle headway maintenance assist system that perform deceleration control of the host vehicle when the headway distance is less than a prescribed headway distance threshold.

2. Background Information

Currently, vehicle headway maintenance assist systems have been proposed that apply a driving force and/or a braking force to a vehicle for controlling the headway distance from a host vehicle to a preceding vehicle in order to maintain the headway distance between the host vehicle and the preceding vehicle at a prescribed distance. One example of such a vehicle headway maintenance assist system is disclosed in Japanese Laid-Open Patent Application No. 2005-329786.

In view of the conventional headway maintenance assist systems, it will be apparent to those skilled in the art from this disclosure that there exists a need for an improved vehicle headway maintenance assist system. This invention addresses this need in the art as well as other needs, which will become apparent to those skilled in the art from this disclosure.

SUMMARY OF THE INVENTION

It has been discovered that in conventional headway maintenance assist systems, headway distance control is canceled when the driver operates the accelerator, and headway distance control is idle while the accelerator is being operated. Therefore, sometimes a problem is encountered in that limits are imposed on the operation of deceleration control for maintaining headway distance.

In accordance with one aspect of the present invention, a vehicle headway maintenance assist system is provided that basically comprises a headway distance detection section, an accelerator actuation detection section, a deceleration control section and a reaction force control section. The headway distance detection section is configured to detect a headway distance between a host vehicle and a preceding vehicle. The accelerator actuation detection section is configured to detect actuation of an accelerator of the host vehicle. The deceleration control section is configured to perform deceleration control of the host vehicle based on the headway distance when the accelerator is detected as not being operated while the headway distance detected by the headway distance detection section is less than a prescribed headway distance threshold. The reaction force control section is configured to control a reaction force imparted to the accelerator when the accelerator actuation detection section detects actuation of the accelerator while the headway distance detected by the headway distance detection section is less than the prescribed headway distance threshold.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
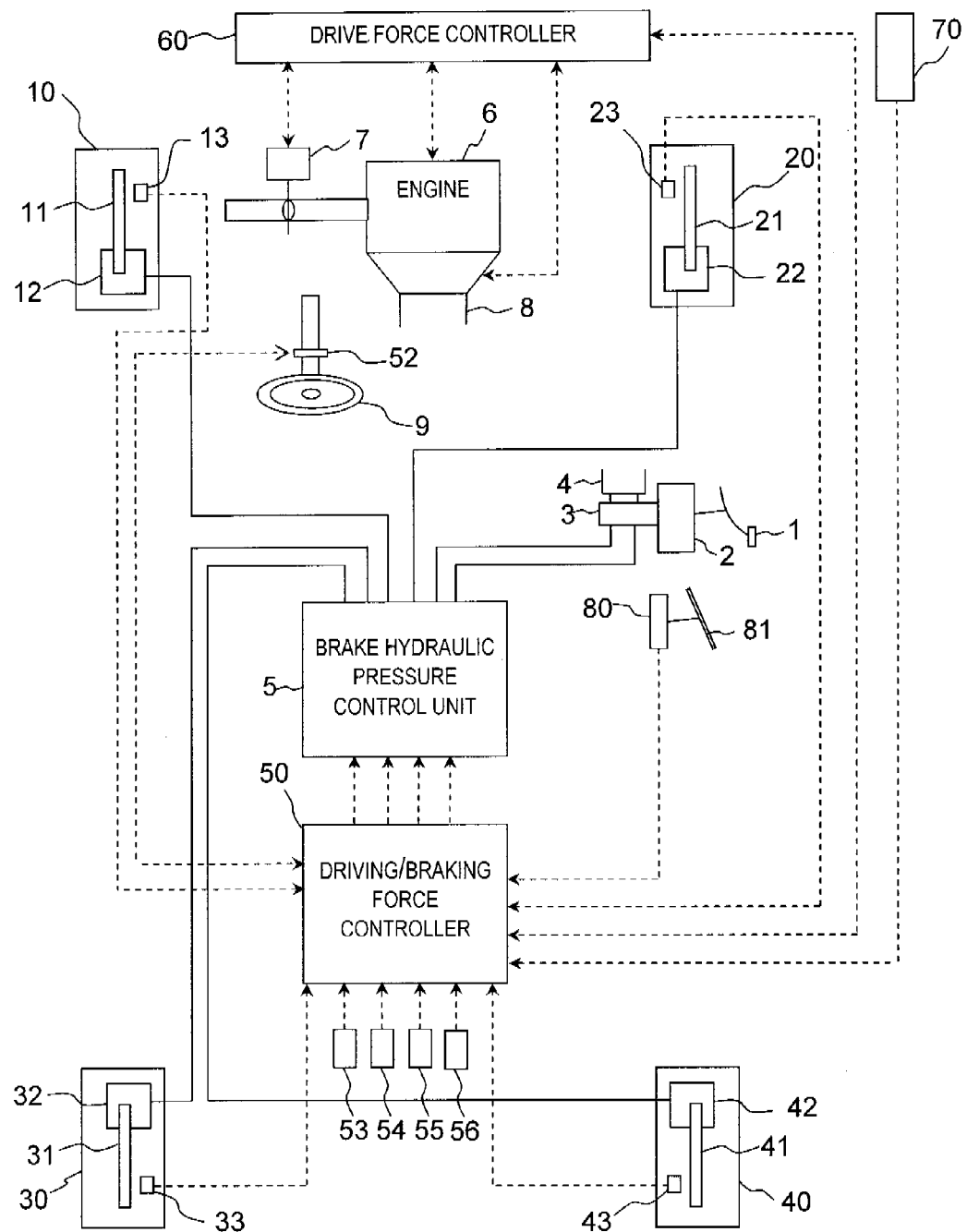
FIG. 1 is a schematic diagram of a vehicle with a vehicle headway maintenance assist system in accordance with a first embodiment of the present invention.

Referring initially to FIG. 1, a vehicle (hereinafter also called "the host vehicle") is schematically illustrated with a vehicle headway maintenance assist system in accordance with a first embodiment of the present invention. In this illustrated embodiment, the headway maintenance assist system is installed in the host vehicle that is a rear-wheel drive vehicle having an automatic transmission and a conventional differential gear. The host vehicle includes a hydraulic braking apparatus that uses a brake pedal 1, a booster 2, a master cylinder 3, a reservoir 4 and a pressure control unit 5 for the driver to input a target braking force to a left front wheel 10 via a brake disk 11 and a wheel cylinders 12, a right front wheel 20 via a brake disk 21 and a wheel cylinders 22, a left rear wheel 30 via a brake disk 31 and a wheel cylinders 32, and a right rear wheel 40 via a brake disk 41 and a wheel cylinders 42. In this host vehicle, the front wheels 10 and 20 and the rear wheels 30 and 40 are configured so that the braking force of the left and right wheels can be independently controlled. Thus, the brake disks 11, 21, 31 and 41 and the wheel cylinders 12, 22, 32 and 42 are configured and arranged in a conventional manner such that the wheel cylinders 12, 22, 32 and 42 frictional hold a corresponding one of the brake disks 11, 21, 31 and 41 for imparting a brake force (braking force) to each wheel by supplying hydraulic braking pressure to each of the wheel cylinders 12, 22, 32 and 42 of the wheels 10, 20, 30 and 40.

The pressure control unit 5 is disposed between the master cylinder 3 and the wheel cylinders 12, 22, 32 and 42. Hydraulic pressure that has been increased by the master cylinder 3 is supplied to each of the wheel cylinders 12, 22, 32 and 42 in accordance with the amount by which the driver depresses the brake pedal 1. The pressure control unit 5 individually controls the brake fluid pressure of the wheel cylinders 12, 22, 32 and 42. The pressure control unit 5 has actuators for forming separate front, rear, left, and right hydraulic pressure supply systems (channels). Thus, the wheels 10, 20, 30 and 40 are thereby separately braked. The actuators are configured using proportion solenoid valves so that, e.g., the hydraulic pressure of the wheel cylinders 12, 22, 32 and 42 can be set to an arbitrary brake fluid pressure.

The host vehicle includes an engine 6, a throttle control device 7, an automatic transmission 8 and a steering wheel 9 as well as other conventional power train components. The host vehicle also includes a driving/braking force controller 50 and a drive force controller 60. The drive force controller 60 is configured to control a drive force (driving force) of the rear (drive) wheels 30 and 40 based on a drive force instruction value inputted from the driving/braking force controller 50. The driving/braking force controller 50 is configured to perform engine control by controlling an amount of fuel injected into the engine 6, for controlling the throttle position with the throttle control device 7, for controlling the automatic transmission 8, as well as other conventional components relating the engine 6. Thus, the drive force of the rear (drive) wheels 30 and 40 is based on this control of the engine 6.

The host vehicle further includes a plurality of wheel speed sensors 13, 23, 33 and 43, a steering angle sensor 52, an acceleration sensor 53, a yaw rate sensor 54, a master cylinder fluid pressure sensor 55 and an accelerator pedal position sensor 56. The signals from the sensors 13, 23, 33, 43, and 52 to 56 are inputted to the driving/braking force controller 50. In particular, the wheel speed sensors 13, 23, 33 and 43 constitute a wheel speed detection section that is configured and arranged to detect the rotational wheel speeds Vw1, Vw2, Vw3, Vw4 of the wheels and send a signal indicative of the wheel speeds to the driving/braking force controller 50. The steering angle sensor 52 constitutes a steering angle detection section that is configured and arranged to detect a steering angle δ of the steering wheel 9 and send a signal indicative of the steering angle to the driving/braking force controller 50. The acceleration sensor 53 constitutes an acceleration detection section that is configured and arranged to detect the longitudinal acceleration Xg of the vehicle and the transverse acceleration Yg of the vehicle and send a signal indicative of the longitudinal and transverse accelerations of the vehicle to the driving/braking force controller 50. The yaw rate sensor 54 constitutes a yaw rate detection section that is configured and arranged to detect the yaw rate ø generated in the vehicle and send a signal indicative of the yaw rate to the driving/braking force controller 50. The master cylinder fluid pressure sensor 55 constitutes a master cylinder fluid pressure detection section that is configured and arranged to detect the master cylinder fluid pressure Pm and send a signal indicative of the master cylinder fluid pressure to the driving/braking force controller 50. The accelerator pedal position sensor 56 constitutes an accelerator pedal position detection section that is configured and arranged to detect the accelerator pedal position and send a signal indicative of the accelerator pedal position to the driving/braking force controller 50.

The drive force controller 60 is configured to calculate an engine torque $1a$, a desired drive force or torque τm based on the amount by which the accelerator pedal 1 is depressed by the driver, and a drive force or torque τw in the drive wheel shaft. The engine torque $1a$, the desired drive force or torque τm and the drive force or torque τw are inputted from the drive force controller 60 to the driving/braking force controller 50.

The host vehicle further includes a laser radar 70, which for example is mounted in a front portion of the host vehicle such as in the front grill, the front bumper or in some other appropriate location of the vehicle. The laser radar 70 detects the headway distance L from the preceding vehicle and the relative speed Vr by sending laser light out in front of the host vehicle and receiving the light that is reflected back off the preceding vehicle located in front of the host vehicle. The relative speed Vr is a value obtained by subtracting the speed of the preceding vehicle from the speed of the host vehicle. The headway distance L and the relative speed Vr detected by the laser radar 70 are sent to the driving/braking force controller 50. Thus, the laser radar 70 constitutes a preceding vehicle detection section that is configured and arranged to detect the headway distance L and the relative speed Vr, and then send a signal indicative of the headway distance and the relative speed to the driving/braking force controller 50.

The host vehicle further includes an accelerator pedal actuator 80 and an accelerator pedal 81. The accelerator pedal actuator 80 is configured and arranged to impart a reaction force to the accelerator pedal 81 based on a command from the driving/braking force controller 50. As used herein, the term "reaction force" refers to force that is applied in a direction opposite to the direction in which the driver depresses the accelerator pedal 81. Thus, the accelerator pedal actuator 80 constitutes a haptic information conveying section that is configured and arranged to convey a risk potential to a driver as haptic information through the accelerator pedal 81, which constitutes a driver-operated driving operation device.

In the headway maintenance assist system according to the first embodiment, when the headway distance L between the host vehicle and the preceding vehicle is less than a headway distance threshold L*, a headway maintenance assistance control is performed to decelerate the vehicle when the driver is not operating the accelerator pedal 81, and a reaction force control is performed to apply a reaction force to the accelerator pedal 81 when the driver is operating the accelerator pedal 81. After the reaction force control is performed to apply reaction force to the accelerator pedal 81, a deceleration control is performed when the driver releases the accelerator pedal 81. However, an acceleration control corresponding to the preceding vehicle is not necessarily performed when the preceding vehicle accelerates. Thus, the headway maintenance assist system as described herein is not equipped with an acceleration control program to maintain a prescribed following distance from the preceding vehicle (e.g., an adaptive cruise control). Of course, an adaptive cruise control could be included if needed and/or desired.

The detailed processes of the headway maintenance assist system will now be described with reference to FIGS. 2 through 6.

Figure 2:
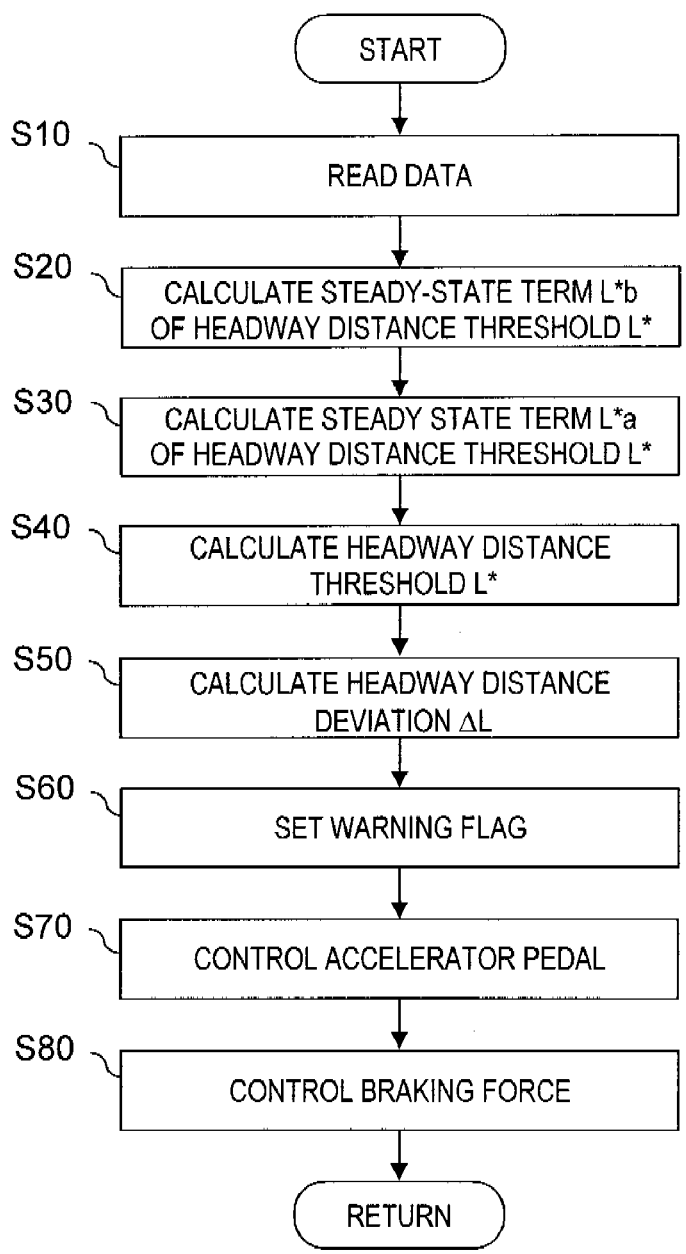
FIG. 2 is a flowchart showing the processing executed by the headway maintenance assist system in accordance with the first embodiment of the present invention.

FIG. 2 is a flowchart showing the process performed by the headway maintenance assist system in the first embodiment. When the host vehicle is started up, the driving/braking force controller 50 initiates the process step S10. In step S10, the following data is read, e.g., the accelerator pedal position Acc detected by the accelerator pedal position sensor 56, the wheel speeds Vw1, Vw2, Vw3, Vw4 detected by the wheel speed sensors 13, 23, 33 and 43, and the headway distance L and the relative speed Vr with respect to the preceding vehicle as detected by the laser radar 70. The process then advances to step S20.

In step S20, a steady-state term L*b of a headway distance threshold L* is calculated based on the speed V of the host vehicle and the relative speed Vr. As will be described later, the headway distance threshold L* is calculated from the sum of the steady-state term L*b, which does not depend on the running condition of the host vehicle, and a transient term L*a, which is preferably calculated (revised) when the preceding vehicle decelerates.

In step S20 of the flowchart shown in FIG. 2, the steady-state term L*b is calculated according to Equation 1 below.

$$L*b = Va \times Th \quad \text{(Equation 1)}$$

In this Equation 1, the parameter Va represents the speed of the preceding vehicle as calculated based on the speed V of the host vehicle and the relative speed Vr, while the parameter Th represents a specific headway time of the host vehicle. The speed V of the host vehicle is calculated by determining a mean value of the speeds Vw1 and Vw2 of the front wheels as detected by the vehicle speed sensors 13 and 23. After the steady-state term L*b of the headway distance threshold is calculated, the process advances to step S30.

In step S30, the transient term L*a of the headway distance threshold L* is calculated. The detailed method for calculating the transient term L*a of the headway distance threshold is described using the flowchart shown in FIG. 3.

Figure 3:
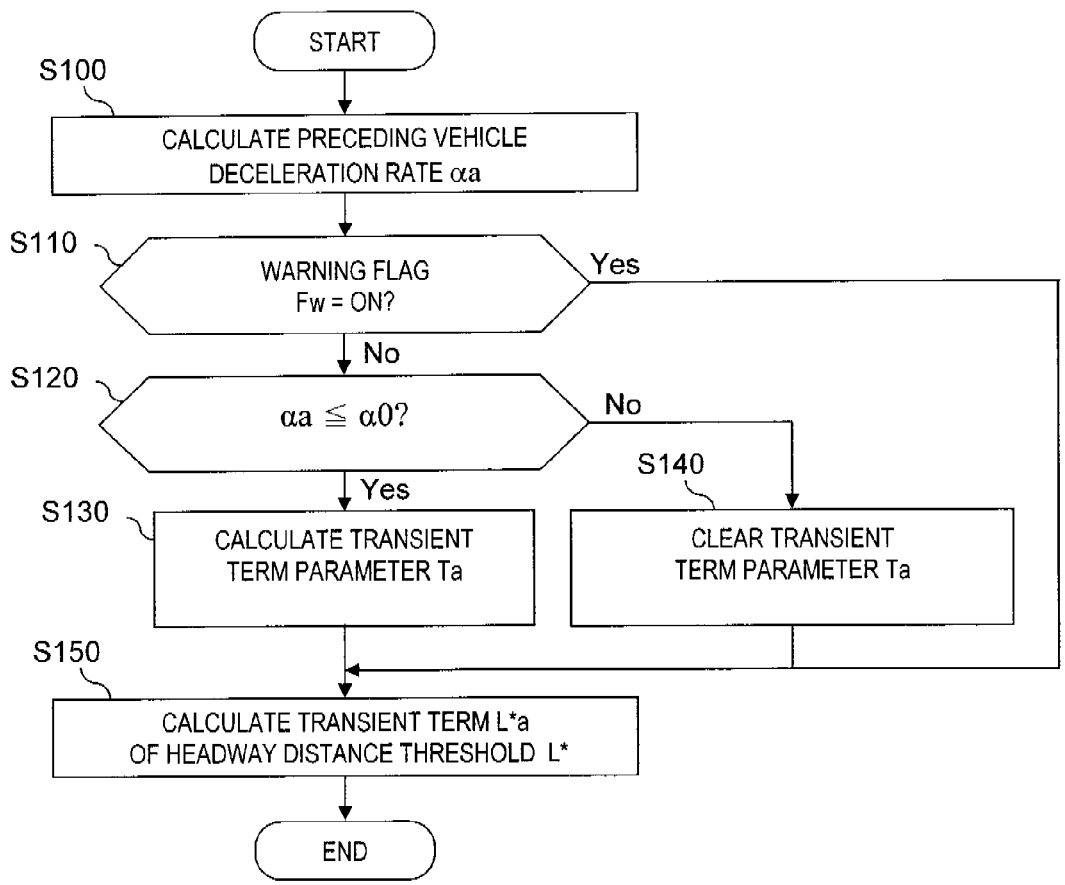
FIG. 3 is a flowchart showing the processing executed for calculating the transient term $L^*a$ of the headway distance threshold in the headway maintenance assist system of the first embodiment of the present invention.

In step S100 of the flowchart shown in FIG. 3, the acceleration/deceleration rate αa of the preceding vehicle is calculated using Equation 2.

$$\alpha a = d(Va)/dt \quad \text{(Equation 2)}$$

In this Equation 2, the parameter Va is the speed of the preceding vehicle calculated based on the speed V of the host vehicle and the relative speed Vr. When the acceleration/deceleration rate αa of the preceding vehicle is calculated by the time differentiation of the speed Va of the preceding vehicle, the process advances to step S110.

In step S110, a determination is made as to whether a warning flag Fw, which is set in step S60 described later, is turned on. The processes in steps S10 through S80 in the flowchart in FIG. 2 are repeated, and a determination is therefore made in this case based on the state of the warning flag Fw set during the preceding process. When the warning flag Fw is determined to be on, the process advances to step S150, and when the warning flag Fw is determined to be off, the process advances to step S120.

In step S120, a determination is made as to whether the acceleration/deceleration rate αa of the preceding vehicle as calculated in step S100 is equal to or less than a specific acceleration/deceleration rate α0. The specific acceleration/deceleration rate α0 is a threshold for determining whether the preceding vehicle is decelerating. Both the acceleration/deceleration rates αa and α0 are positive during acceleration and negative during deceleration. When the acceleration/deceleration rate αa of the preceding vehicle is determined to be equal to or less than the specific acceleration/deceleration rate α0, it is concluded that the preceding vehicle is decelerating, a preceding vehicle deceleration flag Fdec_a is turned on, and the process then advances to step S130. When the acceleration/deceleration rate αa of the preceding vehicle is determined to be greater than the specific acceleration/deceleration rate α0, it is concluded that the preceding vehicle is not decelerating, the preceding vehicle deceleration flag Fdec_a is turned off, and the process advances to step S140.

In step S130, a parameter Ta for calculating the transient term L*a of the headway distance threshold is calculated using Equation 3.

$$Ta = (L - L*b)/Vr \quad \text{(Equation 3)}$$

In Equation 3, the parameter Ta represents the time obtained by dividing the remaining distance element (L−L*b) by the relative speed Vr. The remaining distance element is the actual headway distance L less the steady-state term L*b of the headway distance threshold at the time when the preceding vehicle begins to decelerate. When the parameter Ta is calculated, the process advances to step S150.

In step S140, which takes effect after it is determined that the preceding vehicle is not decelerating, the parameter Ta for calculating the transient term L*a of the headway distance threshold is set to 0, and the process advances to step S150.

In step S150, the transient term L*a of the headway distance threshold is calculated using Equation 3.

$$L*a = Ta \times Vr \quad \text{(Equation 4)}$$

As can be seen from the process in steps S120 through S150, the transient term L*a of the headway distance threshold is set when the preceding vehicle is decelerating, and is 0 when the preceding vehicle is not decelerating.

In step S150, when the transient term L*a of the headway distance threshold is calculated, the process advances to step S40 in the flowchart shown in FIG. 2. In step S40, the headway distance threshold L* is calculated by adding the steady-state term L*b and the transient term L*a of the headway distance threshold (see Equation 5).

$$L* = L*b + L*a \quad \text{(Equation 5)}$$

In step S50, which follows step S40, Equation 6 is used to calculate the deviation ΔL between the headway distance threshold L* calculated in step S40, and the headway distance L from the preceding vehicle detected by the laser radar 70. When the deviation ΔL is calculated, the process advances to step S60.

$$\Delta L = L* - L \quad \text{(Equation 6)}$$

In step S60, the warning flag Fw is set based on the deviation ΔL calculated in step S50. If the deviation ΔL is equal to or greater than 0, the headway distance L from the preceding vehicle is equal to or less than the headway distance threshold L*, and the warning flag Fw is therefore turned on. If the deviation ΔL is less than 0, the warning flag Fw is turned off. The process advances to step S70 when the warning flag Fw is set.

In step S70, control is implemented in which reaction force is applied to the accelerator pedal based on the deviation ΔL calculated in step S50. The detailed process specifics of the control for applying reaction force to the accelerator pedal are described using the flowchart shown in FIG. 4.

Figure 4:
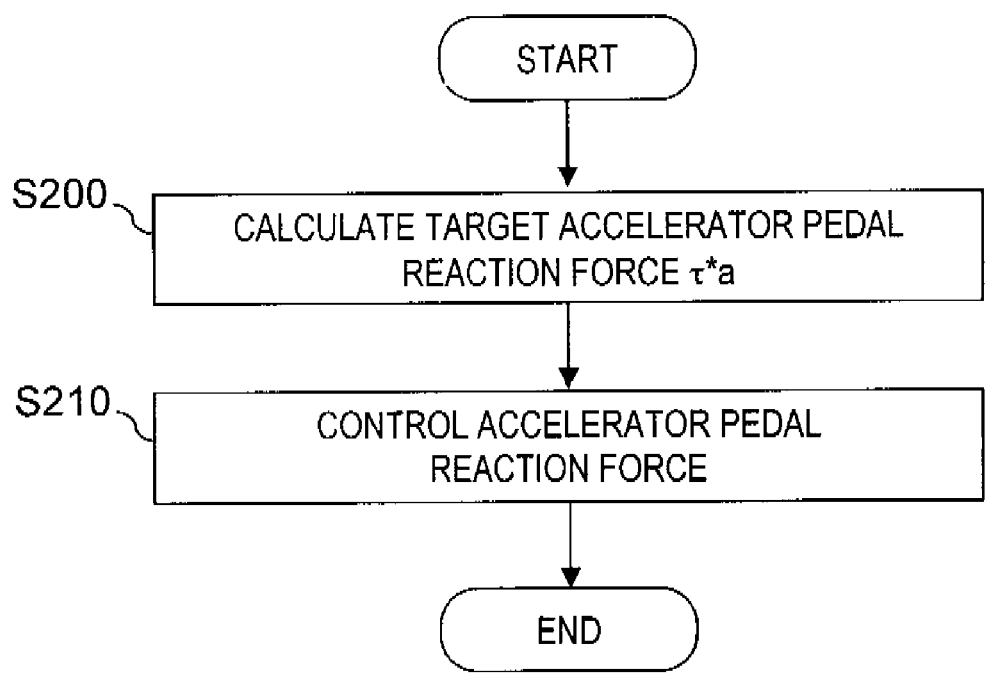
FIG. 4 is a flowchart showing the processing steps of a process for controlling the reaction force that is imparted to the accelerator pedal in the headway maintenance assist system of the first embodiment.

In step S200 of the flowchart shown in FIG. 4, the target accelerator pedal reaction force τ*a is calculated from Equation 7.

$$\tau^*a = Kp \times \Delta L \qquad \text{(Equation 7)}$$

The value Kp (Kp>0) in Equation 7 is a specific gain for calculating the target accelerator pedal reaction force from the headway distance deviation ΔL.

In step S210, which follows step S200, the accelerator pedal actuator 80 is instructed to subject the accelerator pedal 81 to a reaction force corresponding to the target accelerator pedal reaction force τ*a calculated in step S200. Having received this instruction, the accelerator pedal actuator 80 then applies a reaction force corresponding to the target accelerator pedal reaction force τ*a to the accelerator pedal 81. As is clear from Equation 7, the reaction force is applied to the accelerator pedal 81 when ΔL is positive; i.e., when the headway distance L is less than the headway distance threshold L*. When the process in step S210 is complete, the process advances to step S80 in the flowchart shown in FIG. 2.

In step S80, braking is controlled based on the headway distance deviation ΔL calculated in step S50. The detailed process specifics of this braking control performed in step S80 are described using the flowchart shown in FIG. 5.

Figure 5:
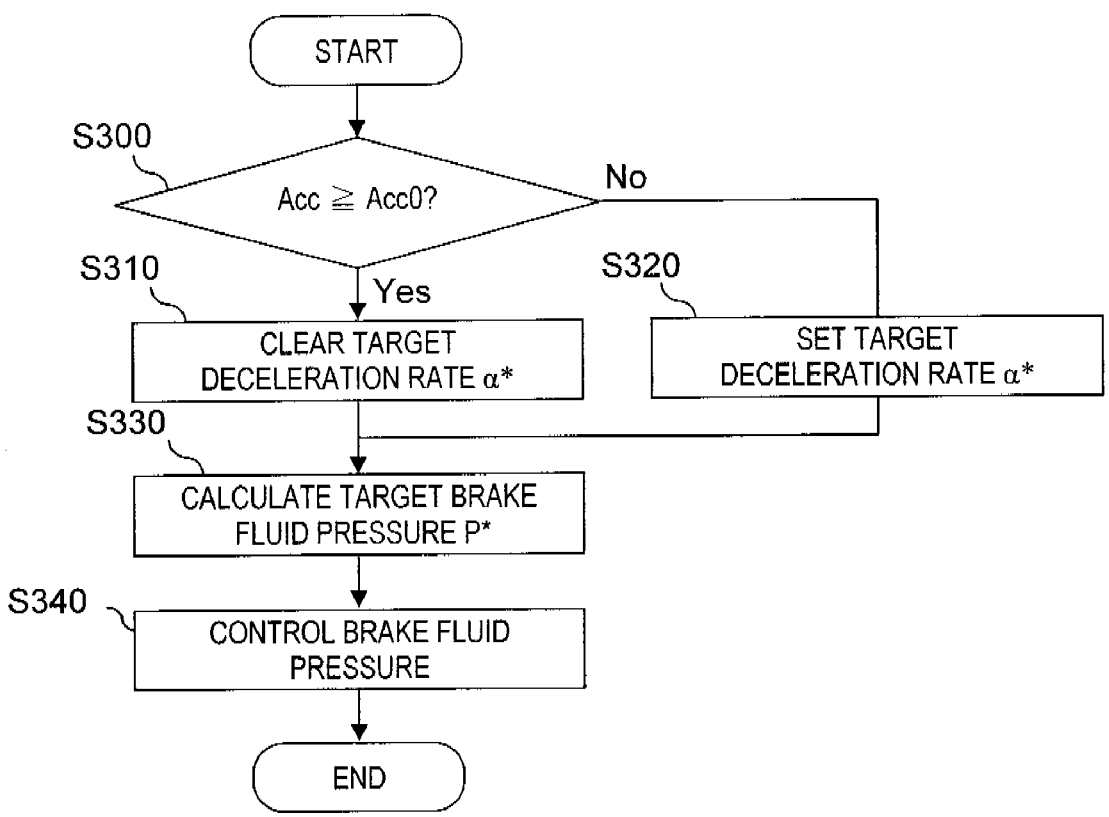
FIG. 5 is a flowchart showing the processing steps of a process for performing brake force control.

In step S300 of the flowchart shown in FIG. 5, a determination is made as to whether the accelerator position Acc detected by the accelerator position sensor 56 is equal to or greater than a specific accelerator position threshold Acc0. The specific accelerator position threshold Acc0 is preset to a low level at which it is possible to determine whether the accelerator is completely closed. If the accelerator position Acc is determined to be equal to or greater than the specific accelerator position threshold Acc0, it is concluded that the driver is operating the accelerator pedal, an acceleration operation flag Facc is turned on, and the process advances to step S310. If the accelerator position Acc is determined to be less than the specific accelerator position threshold Acc0, it is concluded that the driver is not operating the accelerator pedal, the acceleration operation flag Facc is turned off, and the process advances to step S320.

In step S310, a target deceleration rate α* for decelerating the vehicle is set to 0, and the process advances to step S330. In step S320, the target deceleration rate α* is calculated using Equation 8, and the process advances to step S330.

$$\alpha^* = -Kv \times Kr \times \Delta L \qquad \text{(Equation 8)}$$

The value Kr is the gain for calculating the target deceleration force produced in the vehicle based on the headway distance deviation ΔL. This gain is set based on the acceleration/deceleration rate αa of the preceding vehicle, as described later. The gain Kv is the gain for converting the target deceleration force into the target deceleration rate. This gain is set in advance based on vehicle specifications.

Figure 6:
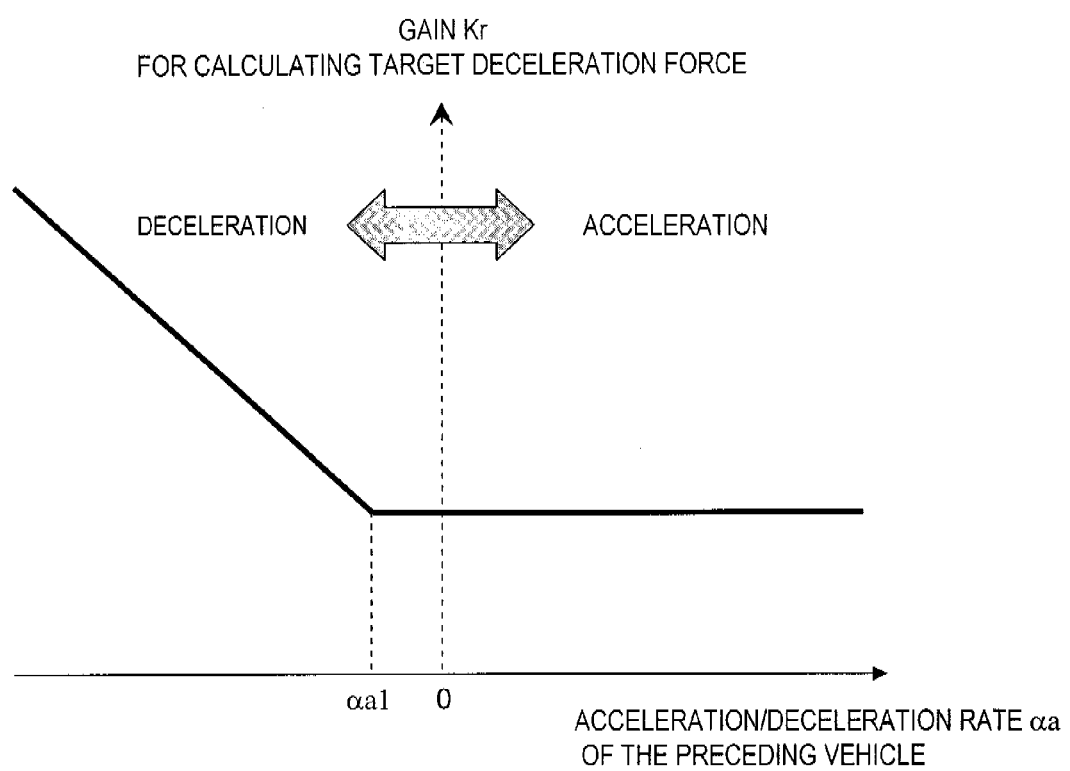
FIG. 6 is a diagram showing the relationship between the gain Kr and the acceleration/deceleration speed $\alpha a$ of the preceding vehicle.

FIG. 6 is a diagram showing the relationship between the acceleration/deceleration rate αa of the preceding vehicle and the gain Kr. As shown in FIG. 6, the smaller the acceleration/deceleration rate αa of the preceding vehicle; i.e., the greater the degree of deceleration of the preceding vehicle, the greater the gain Kr. The deceleration rate of the host vehicle during deceleration control can thereby be made greater as the deceleration of the preceding vehicle increases. When the acceleration/deceleration rate αa of the preceding vehicle is greater than a specific acceleration/deceleration rate αa1, the gain Kr assumes a specific value (1, for example). A table specifying the relationship between the acceleration/deceleration rate αa of the preceding vehicle and the gain Kr as shown in FIG. 6 is stored in advance in the memory (not shown) of the braking force controller 50, and the gain Kr is determined based on this table and on the acceleration/deceleration rate αa of the preceding vehicle.

In step S330, a target brake fluid pressure P* is calculated. To calculate this target brake fluid pressure P*, first, as shown in Equation 9, a target deceleration rate α*brk produced by the brakes is calculated by subtracting the deceleration rate α*eng produced by engine braking from the target deceleration rate α* calculated in step S310 or step S320.

$$\alpha^*\text{brk} = \alpha^* - \alpha^*\text{eng} \qquad \text{(Equation 9)}$$

The values α*, α*brk, and α*eng are all positive during acceleration and negative during deceleration. When the accelerator pedal is being operated (when the acceleration operation flag Facc is on), α*brk=0 because α*=α*eng=0.

Next, a target brake fluid pressure P* is calculated using Equation 10 based on the calculated target deceleration rate α*brk.

$$P^* = -(Kb \times \alpha^*\text{brk}) \qquad \text{(Equation 10)}$$

The value Kb is the gain for converting the target deceleration rate into a target brake fluid pressure, and is set in advance based on vehicle specifications. When the accelerator pedal is being operated (when the acceleration operation flag Facc is on), P*=0 because α*brk=0.

In step S340, which follows step S330, the pressure control unit 5 is instructed to produce a brake fluid pressure based on the target brake fluid pressure P* calculated in step S330. Having received this instruction, the pressure control unit 5 produces a brake fluid pressure based on the target brake fluid pressure P*, and supplies this pressure to the wheel cylinders 12, 22, 32 and 42. Thereby, if the driver is not operating the accelerator pedal 81 when the headway distance L is less than the headway distance threshold L*, control is performed to decelerate the vehicle. When the driver is operating the accelerator pedal, deceleration control is not implemented because the target brake fluid pressure P*=0.

Upon being completed in step S80, the process returns to step S10. The processes in steps S10 through S80 are thereafter repeated.

According to the headway maintenance assist system in the first embodiment, when the headway distance L detected by the laser radar 70 is less than the headway distance threshold L*, the reaction force is applied to the accelerator pedal 81 if the driver is operating the accelerator pedal 81, and the deceleration of the host vehicle is controlled if the driver is not operating the accelerator pedal 81. The driver is thereby prompted to release the accelerator pedal 81 if the driver is operating the accelerator pedal 81 when the headway distance L is less than the headway distance threshold L*, and deceleration control is implemented when the driver releases the accelerator pedal 81. It is also possible to prevent acceleration control and deceleration control from being implemented simultaneously because deceleration control is not implemented when the driver is operating the accelerator pedal 81.

Also, according to the headway maintenance assist system in the first embodiment, the headway distance threshold L* is set based on the steady-state term L*b calculated irrespective of whether the preceding vehicle is decelerating and on the transient term L*a calculated when the preceding vehicle is decelerating. Therefore, a suitable headway distance threshold corresponding to the deceleration of the preceding vehicle can be set. Specifically, in a case in which the preceding vehicle is not decelerating, the value of the transient term L*a is 0, the host vehicle is controlled based on the steady-state term L*b and the headway distance L, and the value obtained by adding the transient term L*a to the steady-state term L*b is used as the headway distance threshold L* when the preceding vehicle begins to decelerate. It is therefore possible to initiate deceleration control or control for applying reaction force to the accelerator pedal 81 more quickly than before the preceding vehicle begins to decelerate.

Furthermore, according to the headway maintenance assist system in the first embodiment, the value of the transient term L*a is updated in a case in which the headway distance L detected by the laser radar 70 is greater than the headway distance threshold L* (refer to steps S110 through S150 in the flowchart shown in FIG. 3). Therefore, rapid changes in the behavior of the vehicle can be prevented because the value of the transient term L*a is not updated in a case in which the headway distance L is less than the headway distance threshold L*; i.e., in a case in which deceleration control or control for applying the reaction force to the accelerator pedal 81 is implemented. In a case in which the headway distance L is greater than the headway distance threshold L*; i.e., in a case in which deceleration control or control for applying the reaction force to the accelerator pedal 81 is not implemented, deceleration control or control for applying the reaction force to the accelerator pedal 81 can be initiated with suitable timing by updating the value of the transient term L*a.

In the headway maintenance assist system in the first embodiment, when the headway distance L between the host vehicle and the preceding vehicle was less than the headway distance threshold L*, control for decelerating the vehicle was implemented as long as the driver was not operating the accelerator pedal 81, and control for applying reaction force to the accelerator pedal 81 was implemented as long as the driver was operating the accelerator pedal 81. In the headway maintenance assist system in the second embodiment, when the headway distance L between the host vehicle and the preceding vehicle is less than a first headway distance threshold L*1, control for applying reaction force to the accelerator pedal 81 corresponding to accelerator pedal operation is implemented as long as the driver is operating the accelerator pedal 81, and control for decelerating the vehicle (primary deceleration control) is implemented as long as the driver is not operating the accelerator pedal 81. When the headway distance L between the host vehicle and the preceding vehicle is less than a second headway distance threshold L*2 (L*2<L*1), control for applying reaction force to the accelerator pedal 81 is implemented if the driver is operating the accelerator pedal 81, and control for decelerating the vehicle (secondary deceleration control) is implemented if the driver is not operating the accelerator pedal 81. This apparatus does not control acceleration in which the preceding vehicle is tracked. The following is a description of the detailed process specifics, made with reference to FIGS. 7 through 10. The configuration of the headway maintenance assist system in the second embodiment is the same as the configuration of the headway maintenance assist system in the first embodiment shown in FIG. 1.

Figure 7:
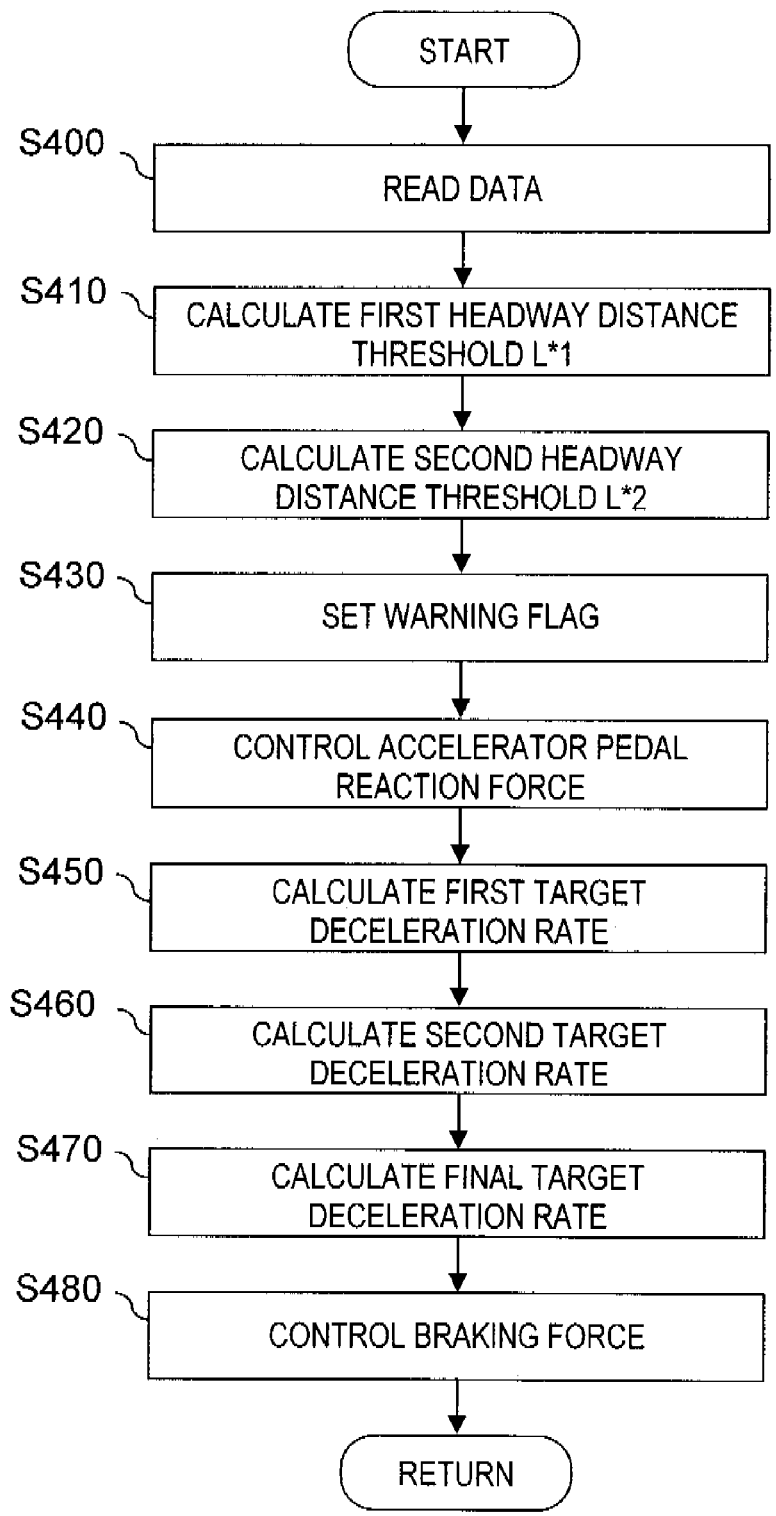
FIG. 7 is a flowchart showing the processing executed by the headway maintenance assist system in accordance with a second embodiment of the present invention.
Figure 8:
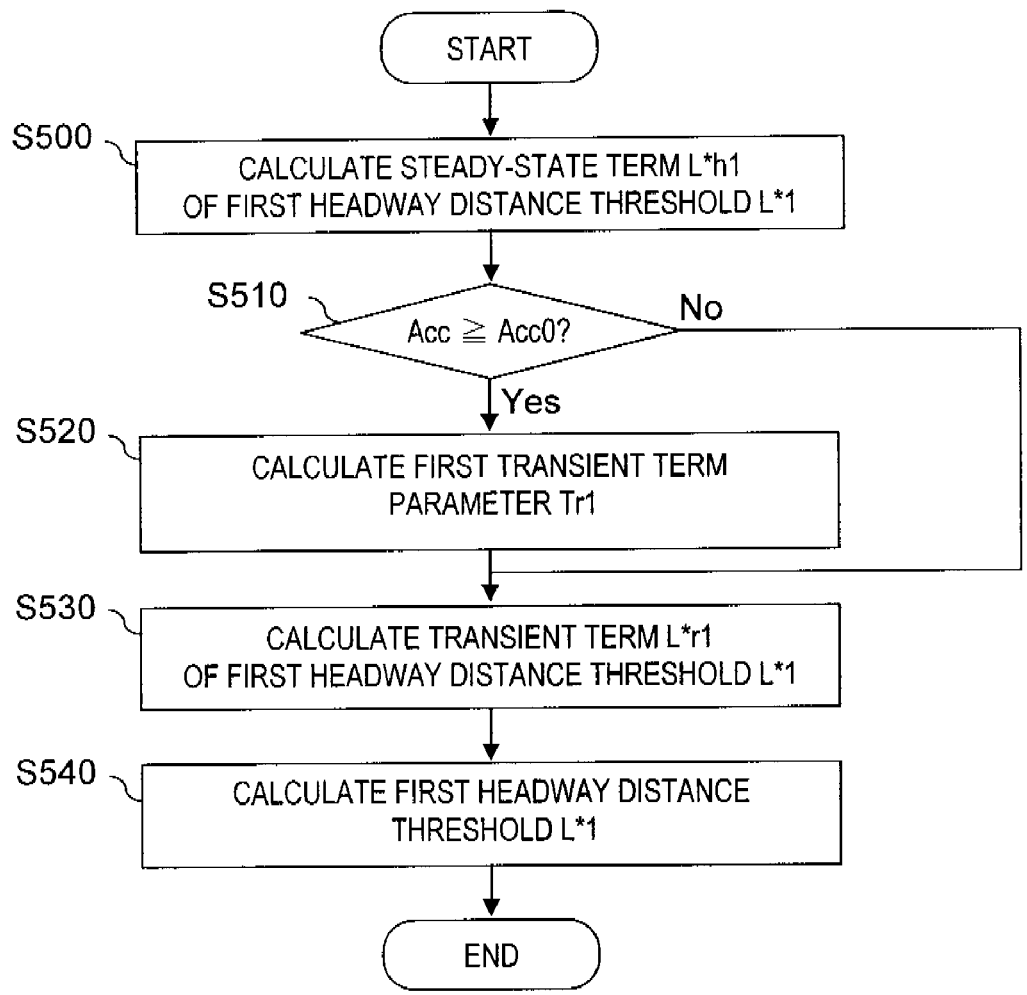
FIG. 8 is a flowchart showing the processing executed for calculating the first headway distance threshold $L^*1$ in the headway maintenance assist system of the second embodiment of the present invention.

FIG. 7 is a flowchart showing the process performed by the headway maintenance assist system in the second embodiment. When the host vehicle is started up, the driving/braking force controller 50 initiates the process step S400. In step S400, the following data is read, e.g., the accelerator pedal position Acc detected by the accelerator pedal position sensor 56, the wheel speeds Vw1, Vw2, Vw3, Vw4 detected by the wheel speed sensors 13, 23, 33 and 43, and the headway distance L and the relative speed Vr with respect to the preceding vehicle as detected by the laser radar 70. The process then advances to step S410.

In step S410, the first headway distance threshold L*1 is calculated. The first headway distance threshold L*1 is calculated from the sum of a steady-state term L*h1, which does not depend on the running condition of the host vehicle, and a transient term L*r1, which depends on the running condition of the host vehicle. The specific method for calculating the first headway distance threshold L*1 will be described using the flowchart shown in FIG. 8.

In step S500 of the flowchart shown in FIG. 3, the steady-state term L*h1 is calculated according to Equation 11 below.

$$L*h1 = Va \times Th \qquad \text{(Equation 11)}$$

In this Equation 1, the parameter Va represents the speed of the preceding vehicle as calculated based on the speed V of the host vehicle and the relative speed Vr, while the parameter Th represents a specific headway time of the host vehicle. The speed V of the host vehicle is calculated by determining a mean value of the speeds Vw1 and Vw2 of the front wheels as detected by the vehicle speed sensors 13 and 23.

In step S510, which follows step S500, the driving/braking force controller 50 determines whether the accelerator pedal position Acc detected by the accelerator pedal position sensor 56 is equal to or greater than a specific accelerator pedal position threshold Acc0, If the accelerator pedal position Acc is determined to be equal to or greater than the specific accelerator pedal position threshold Acc0, then it is determined that the driver is depressing (operating) the accelerator pedal 81. Thus, an accelerator operation flag Facc is turned "on" when it is determined that the driver is depressing on the accelerator pedal 81, and then the process advances to step S520. If the accelerator pedal position Acc is determined to be less than the specific accelerator pedal position threshold Acc0, then it is determined that the driver is not depressing on the accelerator pedal 81. Thus, the accelerator operation flag Facc is turned "off" when it is determined that the driver is not depressing on the accelerator pedal 81, and then the process advances to step S530.

In step S520, Equation 12 is used to calculate a first transient term parameter Tr1 for calculating the transient term L*r1 of the first headway distance threshold L*1.

$$Tr1 = (L - L*h1)/Vr \qquad \text{(Equation 12)}$$

In this Equation 12, the first transient term parameter Tr1 is the time taken for the headway distance L to reach the steady-state term L*h1 of the first headway distance threshold, assuming that the current relative speed Vr is maintained. When the parameter Tr1 is calculated, the process advances to step S530.

As can be seen from the process in steps S510 and S520, the first transient term parameter Tr1 for calculating the transient term L*r1 of the first headway distance threshold is calculated (renewed) only when the accelerator operation flag Face is turned on. Therefore, the first transient term parameter Tr1 is set according to the actual headway distance L when the accelerator pedal 81 is being depressed, and the parameter value that was in effect when the accelerator pedal 81 ceased to be depressed is maintained when the accelerator pedal 81 is not being depressed.

In step S530, the transient term L*r1 of the first headway distance threshold L*1 is calculated according to Equation 13, and the process advances to step S540.

$$L^{*}r1 = Tr1 \times Vr \qquad \text{(Equation 13)}$$

In step S540, the first headway distance threshold L*1 is calculated by adding together the steady-state term L*h1 of the first headway distance threshold calculated in step S500, and the transient term L*r1 of the headway distance threshold calculated in step S520 (see Equation 14).

$$L^{*}1 = L^{*}h1 + L^{*}r1 \qquad \text{(Equation 14)}$$

When the accelerator pedal 81 is being depressed (when the accelerator operation flag Facc is turned on), L*1=L according to Equations 12, 13, and 14. After the first headway distance threshold L*1 is calculated, then the process advances to step S420 in the flowchart shown in FIG. 7.

Figure 12:
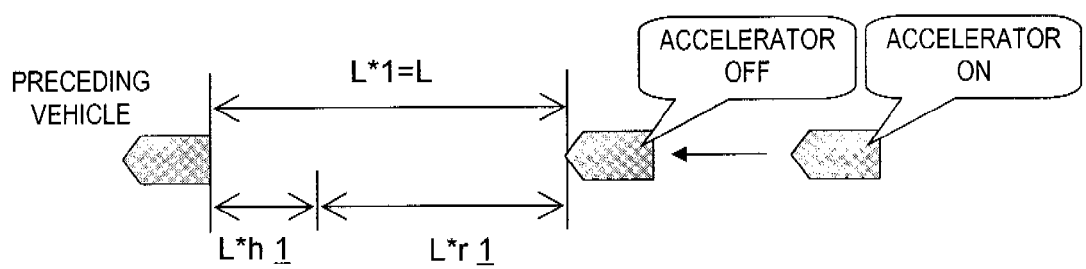
FIG. 12 is a diagram showing the headway distance threshold $L^*$ when the driver ceases to operate (depress) the accelerator pedal.

FIG. 12 is a diagram showing the headway distance threshold L*1 when the driver ceases to depress on the accelerator pedal 81 (i.e., when the accelerator operation flag Facc is turned from "on" to "off"). The headway distance threshold L*1 is set to the headway distance L at the time the accelerator pedal 81 ceases to be depressed, as shown in FIG. 12.

In step S420, the second headway distance threshold L*2 is calculated. The second headway distance threshold L*2 is calculated from the sum of a steady-state term L*h2 calculated regardless of whether the preceding vehicle is decelerating or not and a transient term L*r2 calculated (updated) when the preceding vehicle is decelerating. The specific method for calculating the second headway distance threshold L*2 will now be described using the flowchart shown in FIG. 9.

Figure 9:
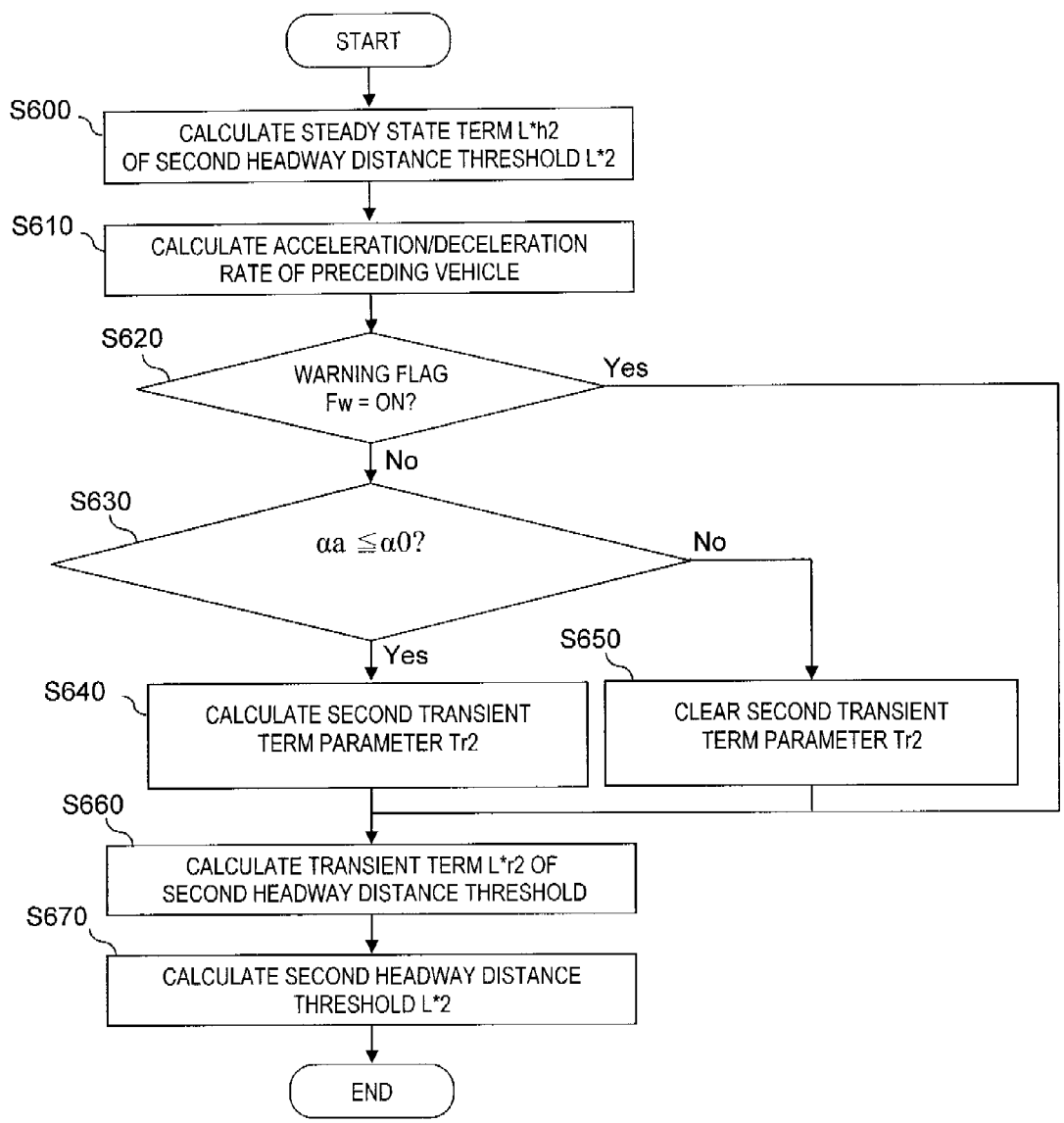
FIG. 9 is a flowchart showing the processing executed for calculating the second headway distance threshold $L^*2$ in the headway maintenance assist system of the second embodiment of the present invention

In step S600 in the flowchart shown in FIG. 9, the steady-state term L*h2 is calculated based on the speed V of the host vehicle and the relative speed Vr. The function for calculating the steady-state term L*h2 is provided in advance based on the host vehicle speed V and the relative speed Vr. Thus, the steady-state term L*h2 is calculated by substituting the host vehicle speed V and the relative speed Vr into this function. When the steady-state term L*h2 of the second headway distance threshold is calculated, the process advances to step S610.

In step S610, the acceleration/deceleration rate αa of the preceding vehicle is calculated using Equation 2, the process advances to step S620. In step S620, a determination is made as to whether a warning flag Fw, which is set in a later-described step S430 (see FIG. 7), has been turned on. The processes in steps S400 through S480 are repeated, and therefore, the determination in step S620 is made in this case based on the state of the warning flag Fw set during the preceding process. When the warning flag Fw is determined to be "on", the process advances to step S660, and when the warning flag Fw is determined to be "off", the process advances to step S630.

In step S630, the driving/braking force controller 50 determines whether the acceleration/deceleration rate αa of the preceding vehicle as calculated in step S610 is equal to or less than a specific acceleration/deceleration rate α0. The specific acceleration/deceleration rate α1 is a threshold for determining whether the preceding vehicle is decelerating or accelerating. Thus, the values of rates αa and α0 are both positive during acceleration and both negative during deceleration. When the acceleration/deceleration rate αa of the preceding vehicle is determined to be equal to or less than the specific acceleration/deceleration rate α0, the driving/braking force controller 50 determines that the preceding vehicle is decelerating, a preceding vehicle deceleration flag Fdec_a is turned "on", and the process then advances to step S640. When the acceleration/deceleration rate αa of the preceding vehicle is determined to be greater than the specific acceleration/deceleration rate α0, the driving/braking force controller 50 determines that the preceding vehicle is not decelerating, the preceding vehicle deceleration flag Fdec_a is turned "off", and the process advances to step S650.

In step S640, a second transient term parameter Tr2 is calculated from Equation 15, below, for calculating the transient term L*r2 of the second headway distance threshold.

$$Tr2 = (L - L^{*}h2)/Vr \qquad \text{(Equation 15)}$$

In this Equation 15, the second transient term parameter Tr2 is the time resulting from dividing the remaining distance (L−L*h2) by the relative speed Vr. The remaining distance is the actual headway distance L less the steady-state term L*h2 of the second headway distance threshold at the time when the preceding vehicle begins to decelerate. When the second transient term parameter Tr2 has been calculated, the process advances to step S660.

In step S650, which takes effect after it is determined that the preceding vehicle is not decelerating, the second transient term parameter Tr2 is cleared (i.e., set to 0) for calculating the transient term L*r2 of the second headway distance threshold, and the process advances to step S660.

In step S660, the transient term L*r2 of the second headway distance threshold is calculated from Equation 16, below, and the process advances to step S670.

$$L^{*}r2 = Tr2 \times Vr \qquad \text{(Equation 16)}$$

In step S670, the second headway distance threshold L*2 is calculated by adding the steady-state term L*h2 and the transient term L*r2 of the second headway distance threshold (see Equation 17).

$$L^{*}2 = L^{*}h2 + L^{*}r2 \qquad \text{(Equation 17)}$$

In step S670, when the second headway distance threshold L*2 has been calculated, the process advances to step S430 in the flowchart shown in FIG. 7. In step S430, the warning flag Fw is set. Therefore, a deviation ΔL2 between the second headway distance threshold L*2 calculated in step S420 and the headway distance L from the preceding vehicle detected by the laser radar 70 is first calculated using Equation 18, below.

$$\Delta L2 = L^{*}2 - L \qquad \text{(Equation 18)}$$

If the deviation ΔL2 calculated from Equation 18 is equal to or greater than 0, then the headway distance L from the preceding vehicle is equal to or less than the second headway distance threshold L*2, and the warning flag Fw is therefore turned "on" in step S430. If the deviation ΔL2 is less than 0, then the warning flag Fw is turned "off" in step S430. The process then advances to step S440 after the warning flag Fw has been set.

In step S440, accelerator pedal reaction force control is implemented in which the reaction force is applied to the accelerator pedal 81 in accordance with the deviation ΔL2 in the headway distance. The detailed processes of this control accelerator pedal reaction force for applying reaction force to the accelerator pedal 81 are described using the flowchart shown in FIG. 10.

Figure 10:
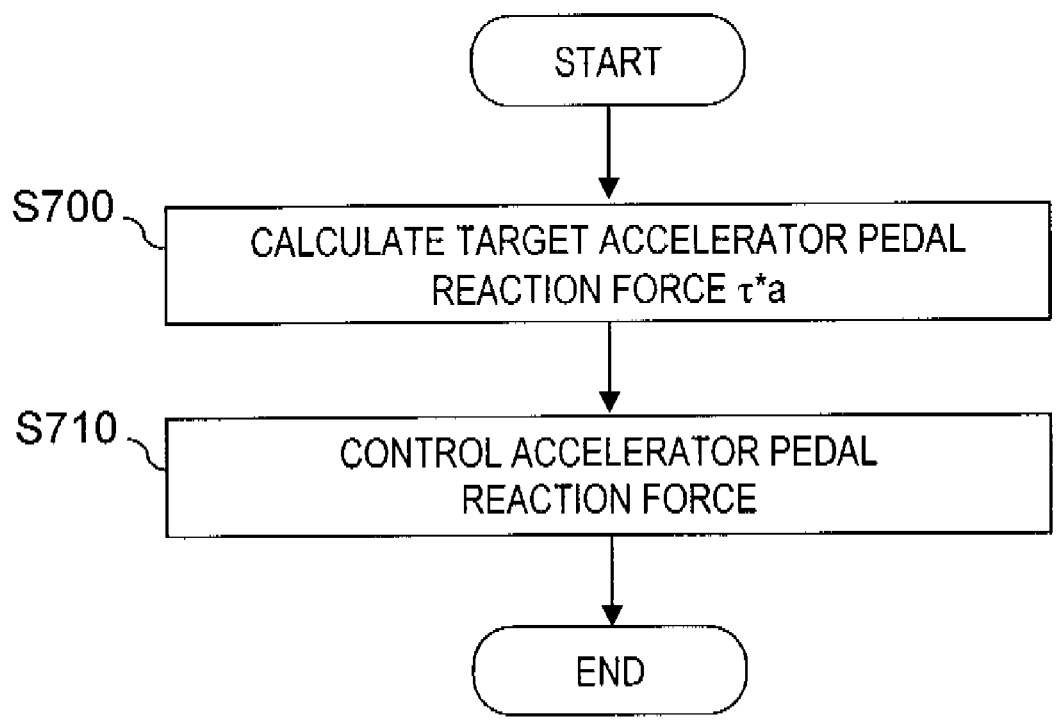
FIG. 10 is a flowchart showing the processing executed for controlling the reaction force that is imparted to the accelerator pedal in the headway maintenance assist system of the second embodiment.

In step S700 of the flowchart shown in FIG. 10, the target accelerator pedal reaction force τ*a is calculated from Equation 19.

$$\tau^{*}a = Kp \times \Delta L2 \qquad \text{(Equation 19)}$$

The value Kp (Kp>0) in Equation 19 is a specific gain for calculating the target accelerator pedal reaction force τ*a from the headway distance deviation ΔL2.

In step S710, which follows step S700, the accelerator pedal actuator 80 is instructed to subject the accelerator pedal 81 to a reaction force corresponding to the target accelerator pedal reaction force τ*a calculated in step S700. Having received this instruction, the accelerator pedal actuator 80 then applies a reaction force corresponding to the target accelerator pedal reaction force τ*a to the accelerator pedal 81. As is clear from Equation 9, the reaction force is applied to the accelerator pedal 81 when the headway distance deviation ΔL2 is positive; i.e., when the headway distance L is less than the headway distance threshold L*2. When the process in step S710 is complete, the process advances to step S450 in the flowchart shown in FIG. 7.

In step S450, a first target deceleration rate α*1 is calculated from Equation 20 based on the first headway distance threshold L*1 calculated in step S410 and based on the headway distance L from the preceding vehicle detected by the laser radar 70.

$$\alpha^*1 = Kv \times Kr1 \times (L^*1 - L) \quad \text{(Equation 20)}$$

The value Kr1 is the gain for calculating the first target deceleration force produced in the host vehicle. The gain Kv is the gain for converting the target deceleration force into the target deceleration rate, and is set in advance based on the host vehicle specifications. The first target deceleration rate α*1 is a positive value during acceleration and a negative value during deceleration.

Figure 13:
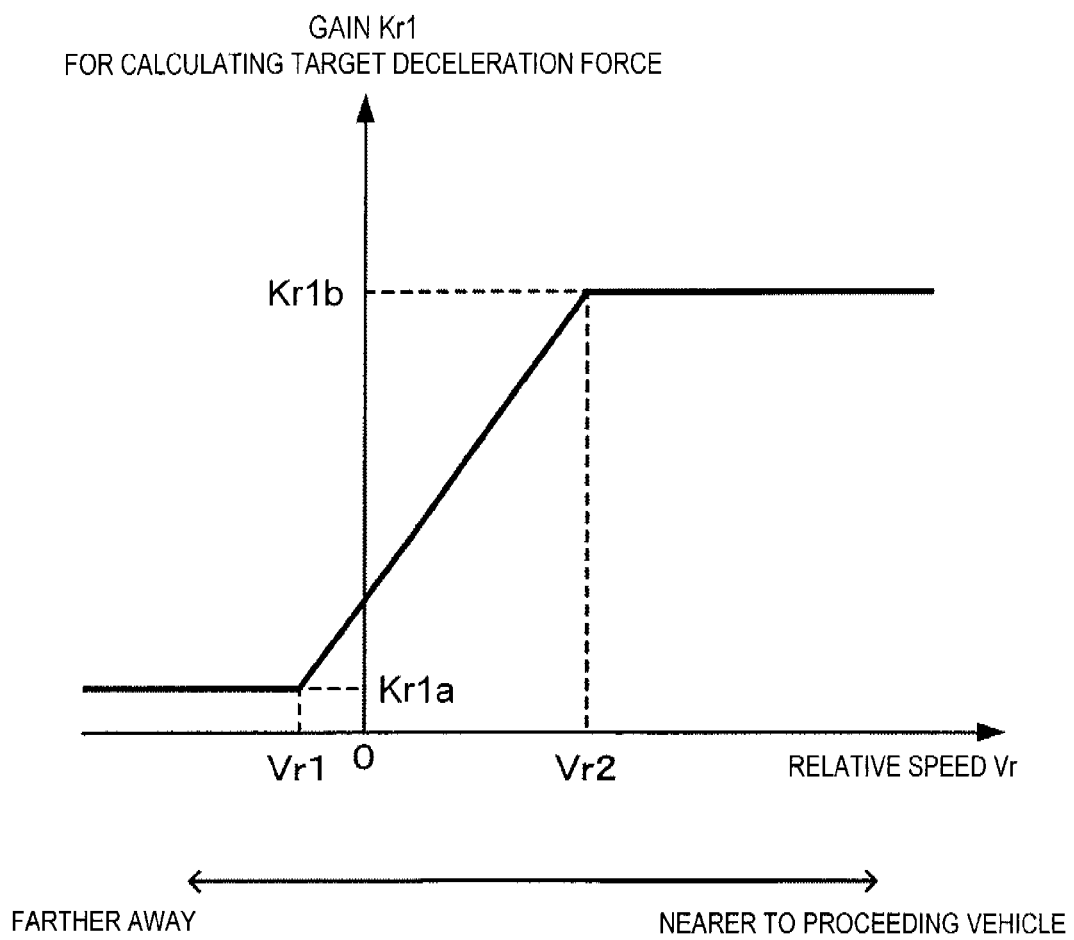
FIG. 13 is a diagram showing the relationship between the relative speed Vr and the gain Kr1.

FIG. 13 is a diagram showing the relationship between the relative speed Vr and the gain Kr1, As shown in FIG. 13, the greater the relative speed Vr; i.e., the closer the host vehicle is to the preceding vehicle, the greater the gain Kr1 is; and the smaller the relative speed Vr is, the smaller the gain Kr1 is. When the relative speed Vr is less than a first relative speed Vr1, then the value of the gain Kr1 is set to a first specific gain Kr1a. When the relative speed Vr is greater than a second relative speed Vr2, the value of the gain Kr1 is a second specific gain Kr1b. The table specifying the relationship between relative speed Vr and gain Kr1, as shown in FIG. 13, is stored in advance in the memory (not shown) of the driving/braking force controller 50, and the gain Kr1 is determined based on this table and the relative speed Vr.

As described above, when the accelerator pedal 81 is being depressed (when the accelerator operation flag Facc is "on"), the first target deceleration rate α*1 is 0 because L*1=L. In cases in which the absolute value of the change rate (degree of deceleration) of the first target deceleration rate α*1 calculated from Equation 20 is less than a specific first lower limit Δα*1, the absolute value of the change rate of the first target deceleration rate α*1 is set to the lower limit Δα*1. When the first target deceleration rate α*1 has been calculated, the process advances to step S460.

In step S460, a second target deceleration rate α*2 is calculated from Equation 21, based on the second headway distance threshold L*2 calculated in step S420 and based on the headway distance L from the preceding vehicle detected by the laser radar 70.

$$\alpha^*2 = Kv \times Kr2 \times (L^*2 - L) \quad \text{(Equation 21)}$$

The value Kr2 is the gain for calculating the second target deceleration force produced in the host vehicle, and the value of the second target deceleration rate α*2 when the accelerator pedal 81 is not being depressed (when the accelerator operation flag Facc is "off" and the target drive force τ*t is set to 0). The second target deceleration rate α*2 is a positive value during acceleration and a negative value during deceleration. The value of the gain Kr2 can be the same as the gain Kr of the first embodiment. In that case, the gain Kr2 can have the same relationship to the acceleration/deceleration rate (xa of the preceding vehicle as the gain Kr as seen in FIG. 6 (discussed above).

When the absolute value (degree of deceleration) of the rate of change of the second target deceleration rate α*2 calculated from Equation 21 is greater than a specific second upper limit Δα*2 (Δα*2>α*1), the absolute value of the rate of change of the second target deceleration rate α*2 is limited so as to be equal to or less than the upper limit Δα*2. Increasing the second upper limit Δα*2 past the first upper limit Δα*1 moderately controls deceleration when the headway distance L is less than the first headway distance threshold L*1. Deceleration can be controlled to quickly move the host vehicle to an appropriate headway distance when the headway distance is less than the second headway distance threshold L*2 (L*2<L*1). When the second target deceleration rate α*2 is calculated, the process advances to step S470.

In step S470, the final target deceleration rate α* produced in the vehicle is determined. In this step, the first target deceleration rate α*1 calculated in step S450 is compared with the second target deceleration rate α*2 calculated in step S460, and the smaller deceleration rate; i.e., the target deceleration having a greater degree of deceleration is set as the final target deceleration rate α*. In this case as well, the final target deceleration rate α* is a positive value during acceleration and a negative value during deceleration.

In step S480, which follows step S470, braking is controlled based on the final target deceleration rate α*. First, as shown in Equation 22, a target deceleration rate α*brk produced by the brakes is calculated by subtracting a deceleration rate α*eng produced by engine braking from the final target deceleration rate α* determined in step S470.

$$\alpha^*\text{brk} = \alpha^* - \alpha^*\text{eng} \quad \text{(Equation 22)}$$

The values α*, α*brk, and α*eng are all positive during acceleration and negative during deceleration. When the accelerator pedal 81 is being depressed (when the accelerator operation flag Facc is on), α*brk=0 because α*=α*eng=0.

Next, a target brake fluid pressure P* is calculated from Equation 23 based on the calculated target deceleration rate α*brk.

$$P^* = -(Kb \times \alpha^*\text{brk}) \quad \text{(Equation 23)}$$

The value Kb is the gain for converting the target deceleration rate into a target brake fluid pressure, and is set in advance based on the host vehicle specifications. When the accelerator pedal 81 is being depressed (when the accelerator operation flag Facc is on), P*=0 because α*brk=0.

The pressure control unit 5 is then instructed to create a brake fluid pressure based on the calculated target brake fluid pressure P*. Having received this instruction, the pressure control unit 5 creates a brake fluid pressure based on the target brake fluid pressure P*, and supplies the brake fluid pressure to the wheel cylinders 12, 22, 32 and 42. Control for decelerating the vehicle is thereby implemented if the driver is not operating the accelerator pedal 81 when the headway distance L is less than both the first headway distance threshold L*1 and the second headway distance threshold L*2. When the driver is operating the accelerator pedal 81, deceleration control is not implemented because the target brake fluid pressure P*=0.

Upon being completed in step S480, the process returns to step S400. The processes in steps S400 through S480 are thereafter repeated.

In the headway maintenance assist system according to the second embodiment, the first headway distance threshold $L*1$ is set based on the headway distance L detected when the accelerator pedal 81 goes from being operated to not being operated. The deceleration of the vehicle is controlled when the headway distance L from the preceding vehicle is less than the first headway distance threshold $L*1$. As long as the headway distance L is less than the second headway distance threshold $L*2$, which is less than the first headway distance threshold $L*1$, the reaction force is applied to the accelerator pedal 81 when the driver is operating the accelerator pedal 81, and the deceleration of the host vehicle is controlled when the driver is not operating the accelerator pedal 81. Deceleration control for the vehicle is implemented when the headway distance L is less than the first headway distance threshold $L*1$ that is set based on the headway distance while the accelerator pedal 81 is off, whereby deceleration can be controlled according to the driving habits of the driver. The driver is prompted to release the accelerator pedal 81 if the driver is operating the accelerator pedal 81 when the host vehicle and the preceding vehicle draw closer and the headway distance L is less than the second headway distance threshold $L*2$, and deceleration control can be implemented when the driver releases the accelerator pedal 81.

In the headway maintenance assist system according to the second embodiment, the first headway distance threshold $L*1$ is set based on the steady-state term $L*h1$ that does not depend on the conditions of the host vehicle, and on the transient term $L*r1$ that does depend on the conditions of the host vehicle. It is thereby possible to set a headway distance threshold that corresponds to the driving habits of the driver by using the transient term $L*r1$ that does depend on the conditions of the host vehicle, while maintaining a steady-state term $L*h1$ that does not depend on the conditions of the host vehicle. The steady-state term is calculated based on the speed of the preceding vehicle, but may also be calculated based on the speed of the host vehicle.

In particular, a suitable headway distance threshold can be set because the transient term $L*r1$ of the first headway distance threshold is set based on the relative speed Vr between the host vehicle and the preceding vehicle. Specifically, the greater the relative speed Vr (the greater the speed with which the host vehicle approaches the preceding vehicle), the greater the value that can be used for the transient term $L*r1$ of the first headway distance threshold. Since the first headway distance threshold is thereby set to a high value, deceleration control can be initiated from a position nearer to the preceding vehicle.

In the headway maintenance assist system according to the second embodiment, the first target deceleration rate $\alpha*1$ is calculated based on the headway distance L and the first headway distance threshold $L*1$, and the second target deceleration rate $\alpha*2$ is calculated based on the headway distance L and the second headway distance threshold $L*2$. Of the first target deceleration rate $\alpha*1$ and second target deceleration rate $\alpha*2$, the target deceleration rate with the greater deceleration rate is set as the final target deceleration rate to control the deceleration of the vehicle. Suitable deceleration control can thereby be performed based on the headway distance L, the first headway distance threshold $L*1$, and the second headway distance threshold $L*2$.

In the headway maintenance assist system according to the second embodiment, an upper limit of the degree of deceleration was set in the first target deceleration rate $\alpha*1$, and an upper limit of the degree of deceleration was assigned for the second target deceleration rate $\alpha*2$. The upper limit of the rate of change of the second target deceleration rate is greater than the upper limit of the rate of change of the first target deceleration rate. Therefore, moderate deceleration control is performed when the accelerator pedal 81 is released at a position nearer to the preceding vehicle than the second headway distance threshold $L*2$, and deceleration control for rapidly moving the host vehicle to a suitable headway distance can be performed when the accelerator pedal 81 is released at a position where the headway distance L is less than the second headway distance threshold $L*2$. Upper limits can be assigned to the first target deceleration rate $\alpha*1$ and the second target deceleration rate $\alpha*2$.

Figure 11:
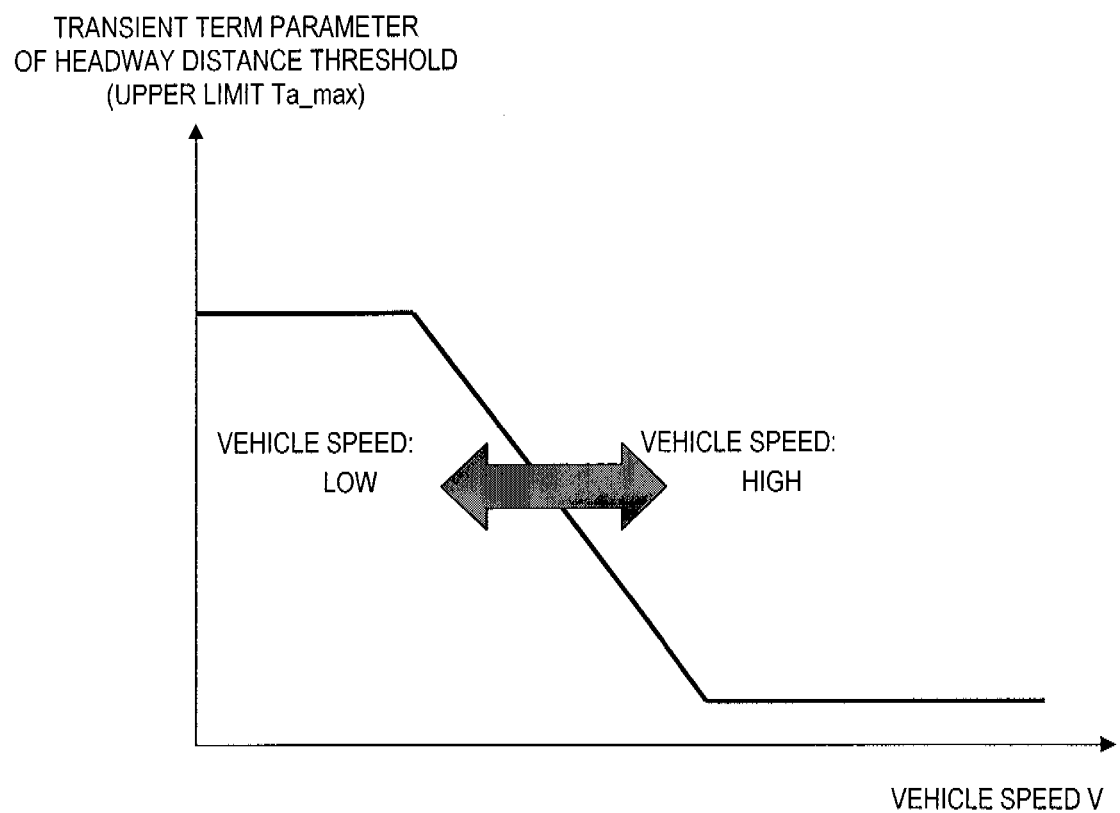
FIG. 11 is a diagram showing an example of the relationship between the speed V of the host vehicle and the headway distance threshold parameter (i.e., the upper limit Ta_max)

The present invention is not limited to the embodiments described above. For example, in the first embodiment, the parameter Ta for calculating the transient term $L*a$ of the headway distance threshold was calculated using Equation 3. An upper limiting value Ta_max may be assigned to the calculated value, and the upper limit may be restricted, or a lower limiting value may be assigned to the calculated value, and the lower limit may be restricted. The upper limit can be set according to the speed V of the host vehicle, for example. FIG. 11 is a diagram showing an example of the relationship between the speed V of the host vehicle and the upper limiting value Ta_max. Similarly, in the second embodiment, an upper limiting value and a lower limiting value may be assigned to the parameter Tr2 for calculating the transient term $L*r2$ of the second headway distance threshold.

The headway distance threshold (steady-state term) $L*b$ in the first embodiment and the second headway distance threshold (steady-state term) $L*h2$ in the second embodiment are calculated based on the speed V of the host vehicle and the relative speed Vr, but these thresholds may also be calculated by multiplying a specific time duration by the speed of the host vehicle, or these thresholds may be calculated based on at least one parameter selected from the speed of the host vehicle, the relative speed, and the speed of the preceding vehicle.

In the above-described embodiments, brake fluid pressure was supplied to the wheel cylinders to reduce the speed of the vehicle, but the vehicle may be caused to decelerate by using engine braking, downshifting, and other types of deceleration control.

In the second embodiment, the deceleration may also be performed using engine braking when the headway distance L is less than the first headway distance threshold $L*1$, and the deceleration control may be performed by supplying brake fluid pressure to the wheel cylinders 12, 22, 32 and 42 when the headway distance is less than the second headway distance threshold $L*2$. In this case, the user can discern between deceleration control that is performed when the headway distance L is less than the first headway distance threshold $L*1$, and deceleration control that is performed when the headway distance L is less than the second headway distance threshold $L*2$.

In the first embodiment described above, control was performed for applying reaction force to the accelerator pedal 81 as long as the driver was operating the accelerator pedal 81 when the headway distance L between the host vehicle and the preceding vehicle was less than the headway distance threshold $L*$. Another possibility is to vibrate the accelerator pedal 81 instead of applying reaction force to the accelerator pedal 81. Similarly, in the second embodiment, the accelerator pedal can be vibrated if the driver is operating the accelerator pedal when the headway distance L is less than the second headway distance threshold $L*2$.

The present invention is not limited to the accelerator pedal 81 described in the above embodiments. Rather, it will be apparent to those skilled in the art that the present invention can be applied to other types of devices. An accelerator can be a hand operated device that is operated by a driver's hand. For example, the accelerator can be a handle, a joy-stick, etc. The accelerator can be disposed on a steering wheel, a part of an instrument panel, etc.

In the second embodiment, the larger target deceleration rate selected from the first target deceleration rate $\alpha^*1$ and the second target deceleration rate $\alpha^*2$ was set as the final target deceleration rate to carry out deceleration control of the vehicle. However, deceleration control of the vehicle may be carried out after the first target brake fluid pressure $P^*1$ has been calculated based on the first target deceleration rate $\alpha^*1$, the second target brake fluid pressure $P^*2$ has been calculated based on the second target deceleration rate $\alpha^*2$, and the larger of the two target brake fluid pressures has been set as the final target brake fluid pressure.

Also, an upper limit $\alpha^*1_{max}$ may be assigned to the first target deceleration rate $\alpha^*1$, and an upper limit $\alpha^*2_{max}$ ($\alpha^*2_{max} > \alpha^*1_{max}$) may be assigned to the second target deceleration rate $\alpha^*2$.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle headway maintenance assist system comprising:
   a headway distance detection section configured to detect a headway distance between a host vehicle and a preceding vehicle;
   an accelerator actuation detection section configured to detect actuation of an accelerator of the host vehicle;
   a deceleration control section configured to perform deceleration control of the host vehicle based on the headway distance when the accelerator is detected not as being operated while the headway distance detected by the headway distance detection section is less than a prescribed headway distance threshold;
   a reaction force control section configured to control a reaction force imparted to the accelerator when the accelerator actuation detection section detects actuation of the accelerator while the headway distance detected by the headway distance detection section is less than the prescribed headway distance threshold; and
   a headway distance threshold setting section configured to set the prescribed headway distance threshold based on a steady-state term that is computed irrespective of whether the preceding vehicle is decelerating and a transient term that is computed when the preceding vehicle is decelerating.

2. The vehicle headway maintenance assist system according to claim 1, wherein
   the deceleration control section is further configured to perform the deceleration control when the accelerator actuation detection section detects that the accelerator is not operated while the headway distance detected by the headway distance detection section is less than the prescribed headway distance threshold after the reaction force has been applied to the accelerator by the reaction force control section.

3. The vehicle headway maintenance assist system according to claim 1, further comprising
   a vehicle speed detection section configured to detect at least one of a host vehicle speed, a preceding vehicle speed and a relative speed between the host vehicle and the preceding vehicle; and
   the headway distance threshold setting section being configured to calculate the steady-state term based on at least one of the host vehicle speed, the preceding vehicle speed and the relative speed.

4. The vehicle headway maintenance assist system according to claim 1, further comprising
   a relative speed detection section configured to detect a relative speed between the host vehicle and the preceding vehicle; and
   the headway distance threshold setting section being configured to calculate the transient term by subtracting the steady-state term from the headway distance to obtain a resulting distance when the preceding vehicle begins to decelerate and then dividing the resulting distance by the relative speed.

5. The vehicle headway maintenance assist system according to claim 1, wherein
   the headway distance threshold setting section is configured to set the prescribed headway distance threshold by adding the steady-state term and the transient term.

6. The vehicle headway maintenance assist system according to claim 1, wherein
   the headway distance threshold setting section updates the value of the transient term in a case in which the headway distance detected by the headway distance detection section is greater than the prescribed headway distance threshold.

7. The vehicle headway maintenance assist system according to claim 1, wherein
the headway distance threshold setting section sets a primary headway distance threshold for a primary deceleration control based on the headway distance detected by the headway distance detection section when the accelerator actuation detection section has detected that the accelerator has gone from being operated to not being operated, the primary headway distance threshold being greater than the prescribed headway distance threshold; and
the deceleration control section is further configured to control deceleration of the host vehicle when the headway distance detected by the headway distance detection section is less than the primary headway distance threshold for the primary deceleration control set by the headway distance threshold setting unit.

8. The vehicle headway maintenance assist system according to claim 7, wherein
the headway distance threshold setting section is further configured to set the headway distance detected by the headway distance detection section when the accelerator actuation detection section has detected that the accelerator has gone from being operated to not being operated as the primary headway distance threshold for the primary deceleration control.

9. The vehicle headway maintenance assist system according to claim 7, wherein
the headway distance threshold setting section is further configured to set the primary headway distance threshold based on a steady-state term calculated independently of a running condition of the host vehicle and a transient term depending on the running condition of the host vehicle.

10. The vehicle headway maintenance assist system according to claim 9, wherein
the headway distance threshold setting section is further configured to set the primary headway distance threshold by adding the steady-state term and the transient term.

11. The vehicle headway maintenance assist system according to claim 9, wherein
the headway distance threshold setting section is further configured to calculate the transient term based on a relative speed between the host vehicle and the preceding vehicle.

12. The vehicle headway maintenance assist system according to claim 7, further comprising
a target deceleration rate setting section configured to calculate a secondary target deceleration rate of a secondary deceleration control based on the headway distance detected by the headway distance detection section and the prescribed headway distance threshold;
calculate a primary target deceleration rate of the primary deceleration control based on the headway distance detected by the headway distance detection section and the primary headway distance threshold; and
set a final target deceleration rate that is equal to whichever one of the primary and secondary deceleration rates is greater, the deceleration control section being configured to control the deceleration of the host vehicle based on the final target deceleration rate set by the target deceleration rate setting section.

13. The vehicle headway maintenance assist system according to claim 12, further comprising
a target deceleration rate restricting section configured to restrict an upper limit of the primary target deceleration rate to a level below an upper limit of the secondary target deceleration rate.

14. The vehicle headway maintenance assist system according to claim 12, further comprising
a target deceleration rate restricting section configured to restrict an upper limit of a rate of change of the primary target deceleration rate to a level below an upper limit of a rate of change of the secondary target deceleration rate.

15. A vehicle headway maintenance assist system comprising:
headway distance detection means for detecting a headway distance between a host vehicle and a preceding vehicle;
accelerator actuation detection means for detecting actuation of an accelerator of the host vehicle;
deceleration control means for performing deceleration control of the host vehicle based on the headway distance when the accelerator is detected as not being operated while the headway distance detected by the headway distance means remains less than a prescribed headway distance threshold;
reaction force control means for controlling a reaction force imparted to the accelerator when the accelerator is being actuated while the headway distance detected by the headway distance means remains less than the prescribed headway distance threshold; and
headway distance threshold setting means for setting the prescribed headway distance threshold based on a steady-state term that is computed irrespective of whether the preceding vehicle is decelerating and a transient term that is computed when the preceding vehicle is decelerating.

16. A vehicle headway maintenance assist system comprising:
a headway distance detection section configured to detect a headway distance between a host vehicle and a preceding vehicle;
an accelerator actuation detection section configured to detect actuation of an accelerator of the host vehicle;
a deceleration control section configured to perform deceleration control of the host vehicle based on the headway distance when the accelerator is detected not as being operated while the headway distance detected by the headway distance detection section is less than a prescribed headway distance threshold;
a haptic notification control section configured to control a haptic notification imparted to the accelerator when the accelerator actuation detection section detects actuation of the accelerator while the headway distance detected by the headway distance detection section is less than the prescribed headway distance threshold; and
a headway distance threshold setting section configured to set the prescribed headway distance threshold based on a steady-state term that is computed irrespective of whether the preceding vehicle is decelerating and a transient term that is computed when the preceding vehicle is decelerating.

17. A vehicle headway maintenance assistance method comprising:
detecting a headway distance between a host vehicle and a preceding vehicle;
controlling deceleration of a host vehicle based on the headway distance that was detected when an accelerator is not being operated;

controlling a reaction force imparted to the accelerator when the accelerator is being actuated while the headway distance is less than a prescribed headway distance threshold; and setting the prescribed headway distance threshold based on a steady-state term that is computed irrespective of whether the preceding vehicle is decelerating and a transient term that is computed when the preceding vehicle is decelerating.

* * * * *